(12) United States Patent
Wang et al.

(10) Patent No.: US 8,024,312 B2
(45) Date of Patent: *Sep. 20, 2011

(54) CHARACTERISTIC TAGGING

(75) Inventors: Esther Hsiu-Meng Wang, Redmond, WA (US); Ajitesh Kishore, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/839,775

(22) Filed: Jul. 20, 2010

(65) Prior Publication Data

US 2010/0287197 A1 Nov. 11, 2010

Related U.S. Application Data

(63) Continuation of application No. 11/652,830, filed on Jan. 12, 2007, now Pat. No. 7,788,247.

(51) Int. Cl.
*G06F 17/30* (2006.01)

(52) U.S. Cl. ........ 707/705; 707/713; 707/721; 707/758; 707/767; 707/766

(58) Field of Classification Search .......... 707/713, 707/721, 758, 759, 765, 766, 767, 705
See application file for complete search history.

(56) References Cited

U.S. PATENT DOCUMENTS

| | | | |
|---|---|---|---|
| 5,809,481 A * | 9/1998 | Baron et al. ................ | 705/14.4 |
| 6,598,046 B1 | 7/2003 | Goldberg et al. | |
| 6,732,331 B1 | 5/2004 | Alexander | |
| 6,934,712 B2 * | 8/2005 | Kiernan et al. ................ | 1/1 |
| 6,947,947 B2 | 9/2005 | Block et al. | |
| 7,051,023 B2 | 5/2006 | Kapur et al. | |
| 7,092,821 B2 | 8/2006 | Mizrahi et al. | |
| 7,139,761 B2 | 11/2006 | McKibben et al. | |
| 7,305,381 B1 * | 12/2007 | Poppink et al. ................ | 1/1 |
| 7,464,086 B2 * | 12/2008 | Black et al. ................ | 1/1 |
| 7,548,915 B2 | 6/2009 | Ramer et al. | |

(Continued)

FOREIGN PATENT DOCUMENTS

WO WO 2006099407 9/2006

OTHER PUBLICATIONS

Culotta, et al., "Extracting social networks and contact information from email and the Web", Date: 2004, http://www.cs.umass.edu/~ronb/papers/dex.pdf.

(Continued)

*Primary Examiner* — Jean M Corrielus
(74) *Attorney, Agent, or Firm* — Merchant & Gould

(57) ABSTRACT

Embodiments are provided to enable a user to easily and conveniently assign, share, and/or locate characteristic and other information associated with others. In an embodiment, a user can assign, share, and use one or more characterizing tags. A user can use the one or more characterizing tags to characterize a person of interest and/or a relationship or association between the user and the person of interest. A user can also perform searches using one or more characterizing tags to locate others who may be associated with the one or more characterizing tags. Users can also view user profiles including any characterizing tags and/or communicate with others based in part on a characterizing tag. The various embodiments provide a forum for social tagging, allowing a user to apply and use one or more characterizing tags that are associated with a person of interest.

20 Claims, 11 Drawing Sheets

U.S. PATENT DOCUMENTS

| | | |
|---|---|---|
| 2002/0065844 A1 | 5/2002 | Robinson et al. |
| 2004/0044958 A1 | 3/2004 | Wolf et al. |
| 2004/0122835 A1 | 6/2004 | McKibben et al. |
| 2004/0123242 A1 | 6/2004 | McKibben et al. |
| 2004/0158455 A1 | 8/2004 | Spivack et al. |
| 2004/0205528 A1 | 10/2004 | Alexander |
| 2005/0235034 A1 | 10/2005 | Chen et al. |
| 2006/0004892 A1 | 1/2006 | Lunt et al. |
| 2006/0106631 A1 | 5/2006 | Waller |
| 2006/0200434 A1 | 9/2006 | Flinn et al. |
| 2007/0032244 A1* | 2/2007 | Counts et al. ............. 455/456.1 |
| 2007/0100805 A1 | 5/2007 | Ramer et al. |
| 2008/0040674 A1 | 2/2008 | Gupta |
| 2008/0052373 A1 | 2/2008 | Pousti |
| 2008/0104032 A1* | 5/2008 | Sarkar .............................. 707/3 |
| 2008/0172363 A1* | 7/2008 | Wang et al. ....................... 707/3 |
| 2010/0077300 A1* | 3/2010 | Dugan et al. .................. 715/273 |
| 2010/0211535 A1* | 8/2010 | Rosenberger .................. 706/20 |

OTHER PUBLICATIONS

Bearman, et al., "Social Terminology Enhancement through Vernacular Engagement: Exploring Collaborative Annotation to Encourage Interaction with Museum Collections", Date Unknown, http://www.steve.museum/static/reference/dlib-steve-0509preprint.pdf.

Mathes, Adam, "Folksonomies—Cooperative Classification and Communication through Shared Metadata", Date: Dec. 2004, http://blog.namics.com/archives/2005/Folksonomies_Cooperative_Classification.pdf.

Golder, et al., "The Structure of Collaborative Tagging Systems", Date Unknown, http://arxiv.org/ftp/cs/papers/0508/0508082.pdf.

* cited by examiner

FIGURE 9

CHARACTERISTIC TAGGING

RELATED CASE

This application is a continuation of U.S. patent application Ser. No. 11/652,830 filed Jan. 12, 2007 and entitled "Characteristic Tagging," which is hereby incorporated by reference.

BACKGROUND

People can use a number of available communication tools to communicate with one another. For example, e-mail applications enable users to correspond with one another and stay in touch with images, audio, and textual interaction. Smart phones and other handheld devices allow users to communicate and include multimedia functionality, while also providing the freedom to communicate without the confines of a particular location. Enterprise networks also rely on a variety of communications tools to enable enterprise assets, such as co-workers, to exchange and search for information associated with the enterprise. Unfortunately, the current communication tools do not provide an easy and convenient way for a person to associate, share, and locate characteristic information associated with other people.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to enable a user to easily and conveniently assign, share, and/or locate characteristic and other information associated with others. In an embodiment, a user can assign, share, and use one or more characterizing or characteristic tags. A user can use the one or more characterizing tags to characterize a person of interest and/or a relationship or association between the user and the person of interest. A user can also perform searches using one or more characterizing tags to locate others who may be associated with the one or more characterizing tags. Users can also view user profiles including any characterizing tags and/or communicate with others based in part on a characterizing tag.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIG. 9 depicts a tag search interface.

DETAILED DESCRIPTION

Embodiments are provided that enable a user to easily and conveniently associate, share, and/or locate characteristic information associated with others. In an embodiment, a user can assign and/or locate characteristic and other information associated with other users according to the user's personal perception or experience. In one embodiment, a user can associate one or more characterizing tags with a person of interest. The one or more characterizing tags can be used to characterize the person of interest and/or a relationship or association between the user and the person of interest.

Users can also perform searches using one or more characterizing tags to locate persons of interest who may be associated with the one or more characterizing tags. Users can view and edit user profiles including any characterizing tags. Users can also communicate with one or more tagged users based on one or more characterizing tags. The embodiments described herein can be used with a number of applications and are not limited to any particular application implementation or computing architecture.

Figure 1:
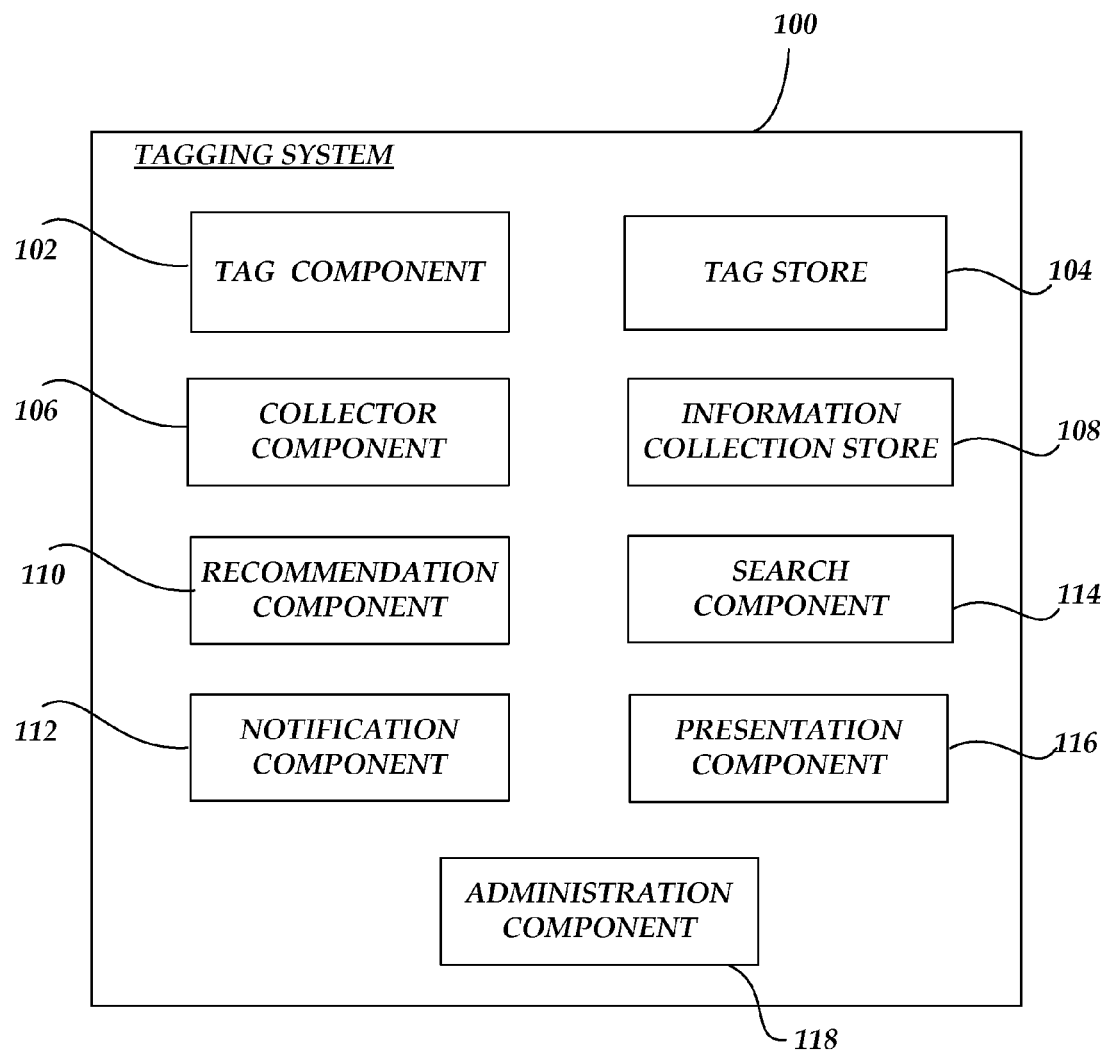
FIG. 1 is a block diagram of a tagging system.

FIG. 1 is a block diagram of a tagging system 100, under an embodiment. The tagging system 100 is configured to enable users to tag persons of interest with a characterizing tag, but is not so limited. For example, a user can create and use one or more characterizing tags to characterize one or more contacts, wherein the one or more characterizing tags characterize the one or more contacts according to the user's personal perception of and/or experience with the one or more contacts.

The tagging system 100 enables a user to easily and conveniently assign, share, and/or locate characteristic information associated with others according to personal perception. A user can use the tagging system 100 to tag a person of interest with a characterizing tag, wherein the characterizing tag may characterize any information associated with the person of interest and/or in accord with a perception of the person who applied the characterizing tag. For example, a user can tag a contact with a characterizing tag that may correspond to something that concerns, involves, draws the attention of, or arouses the curiosity of the contact.

The characterizing tag also may refer to particular aspects of life, culture, and society which attract the attention of a contact for example. As further example, the characterizing tag may refer to a particular location, trait, skill, experience, quality, characteristic, habit, attribute and/or other information associated with a contact. The characterizing tag may also provide an amount of feedback by relaying whether a person was particularly helpful or knowledgeable about certain subject matter. The characterizing tag can also be used to imply certain relationships between a tagged individual and the person who assigned the particular tag. The tagging system 100 allows a tagging community to police itself, while also providing context to relationships according to the characterizing tags. As described below, a characterizing tag can be used a part of a search to locate persons of interest who share the characterizing tag.

As shown in FIG. 1, the tagging system 100 includes a tag component 102. The tag component 102 is configured to enable a user to assign a characterizing tag to a person of interest. In an embodiment, a person of interest can be represented by an object that is a representation of the person of interest. The tagging system 100 is configured to enable a user to interact with the object and associated tag information in the context of the applications that the user is currently using. For example, when the tagging system 100 is operating, a user can right click on a person of interest which operates to open up a menu, enabling the user to add a tag, view/edit a profile (e.g. SHAREPOINT profile, enterprise profile, etc.), or perform some other operation with respect to the person of interest.

In one embodiment, a characterizing tag comprises metadata that can be associated with the object that represents a person of interest. The metadata corresponds to information associated with the person of interest. As described below, the user can manually enter a tag that can be associated with a person of interest and/or select one or more tags that can be automatically suggested to the user as one or more characterizing tags. In an embodiment, the tag component 102 provides an interface that a user can interact with to assign one or more characterizing tags to a person of interest.

With continuing reference to FIG. 1, the assigned characterizing tags can be stored in a tag store 104. In an embodiment, the tag store 104 also includes information associated with who tagged ("the tagger") the particular person of interest, such as the tagger's name, e-mail address, or other identification information associated with the tagger. In one embodiment, the tag store 104 can also include the date and/or time that delineates when the tagger tagged the person of interest with the one or more characterizing tags. The tag store 104 is available to users associated with the tagging system 100.

The tagging system 100 also includes a miner or collector component 106. The collector component 106 is configured to collect information associated with a number of communications and provide a collection of information. For example, the collector component 106 can operate to collect keywords and/or phrases associated with various communications between contacts (e.g. keywords in e-mail correspondence, keywords in text messaging correspondence, keywords from mobile phone communications, etc) and provide a collection of communication information.

In one embodiment, the collector component 106 is configured to organize the collected information according to particular communication participants. The collected information captured by the collector component 106 can be stored in the information collection store 108. In one embodiment, the tagging system 100 can be configured to automatically apply a characterizing tag to a particular person of interest based on a frequency, number of times, or other threshold that a keyword, noun, phrase, etc. is collected by the collector component 106.

The tagging system 100 also includes a recommendation component 110. The recommendation component 110 is configured to use the collected information associated with the number of communications and offer a number of recommended tags to a user of the tagging system 100. In an embodiment, the recommendation component 110 can recommend tags based on prior communications between the tagger and person of interest. Accordingly, the recommendation component 110 can recommend characterizing tags that are unique to the association of the tagger and person of interest. For example, the recommendation component 110 can be used to recall topics that have been discussed and/or an expertise of a person of interest associated with a prior communication.

The recommendation component 110 can recommend one or more characterizing tags according to how the tagger might characterize the person of interest, which can be specific to particular communication participants. In one embodiment, the recommendation component 110 is configured to recommend characterizing tags by excluding tags that have already been associated with a person of interest. That is, the recommendation component 110 is configured to suggest one or more characterizing tags by excluding tags that have already been applied to a person of interest by the tagger.

The tagging system 100 also includes a notification component 112. The notification component 112 is configured to notify a person of interest that the person of interest has been tagged with a characterizing tag. For example, the notification component 112 can be configured to transmit an e-mail to a particular contact, alerting the contact of a recent tag that was applied by a particular tagger. As further example, the notification component 112 can also be configured to send a voicemail or text message to the tagged person of interest. As described below, once notified, the tagged person of interest can use the tagging system 100 to approve, delete, and/or modify the characterizing tag or configure additional tag-related settings.

With continuing reference to FIG. 1, the tagging system 100 also includes a search component 114. In one embodiment, the search component 114 is configured to locate one or more persons of interest based on a characterizing tag search. The search component 114 is configured to search for exact matches, synonyms, correlations, and/or some other type of relative comparisons associated with the characterizing tag. The search component 114 can return search results (e.g. users with the characterizing tag, similar tags, etc.) for the searcher to review and decide how to proceed therefrom. For example, the searcher may decide to look for related information about other people based on the results of a characterizing tag search.

In an embodiment, the search component 114 includes filtering features which enable a searcher to further refine and hone a search to locate a person of interest having particular characteristics or characterizing tags. For example, a user can use the filtering features of the search component 114 to refine a search according to location, relevance, social degree, and other factors. The search component 114 can return the results of a tag search, filtered or otherwise, in order of relevance, rating, or some other criterion. Accordingly, the search component 114 can attribute greater relevance to a result based on how close the search results are as compared to the tag being searched. The data stored in the tag store 104 and/or information collection store 108 can be structured to enable efficient tracking and location of an object, such as a characterizing tag or contact using an ACTIVE DIRECTORY structure for example.

According to one embodiment, when tagging information is stored locally on one or more computing devices, the search component 114 is configured to search (e.g. crawl search) across each tag store 104 of the communicating and/or connected computing devices to locate tagging information associated with a particular search. Alternatively, when tagging information is stored on a dedicated serving computing device, the search component 114 is configured to search the tag store 104 of the dedicated serving computing device to locate tagging information associated with a particular search.

The tagging system 100 also includes a presentation component 116 to present information associated with the results of a search or an interaction. In one embodiment, the presentation component 116 is configured to present profile information associated with the search results including other characterizing tags associated with a person of interest. For example, a user may decide to contact a particular person of interest after reviewing a particular profile presented by the presentation component 116. The presentation component 116 is also configured to present information associated with a particular person of interest in terms of a social network (e.g. search results can be presented in terms of relevance, social distance, tag commonality, etc.). The presentation component 116 can also present one or more characterizing tags that are associated with a particular person of interest when a user is preparing to communicate with the person of interest.

The tagging system 100 further includes an administration component 118 configured to allow a user to administer features of the tagging system 100. For example, the administration component 118 can be used to allow or disallow tagging according to a particular social criterion (e.g. limited to one-degree, two-degree, etc., buddies, family, location, or other factors). The administration component 118 can also be used to block or prevent users from tagging a particular person of interest (e.g. executives, private parties, etc.) or enable tagging for particular users. For example, an administrator can use the administration component 118 to block a group of people (e.g. all engineers) from being tagged. The administration component 118 may also be used to print reports according to particular preference (e.g. total number of tags, tag frequency, average number of tags per person, average number of tags that a person has assigned, etc.). In an embodiment, one or more of the above-described components can be configured as an interface allowing a user to interact therewith.

Figure 2:
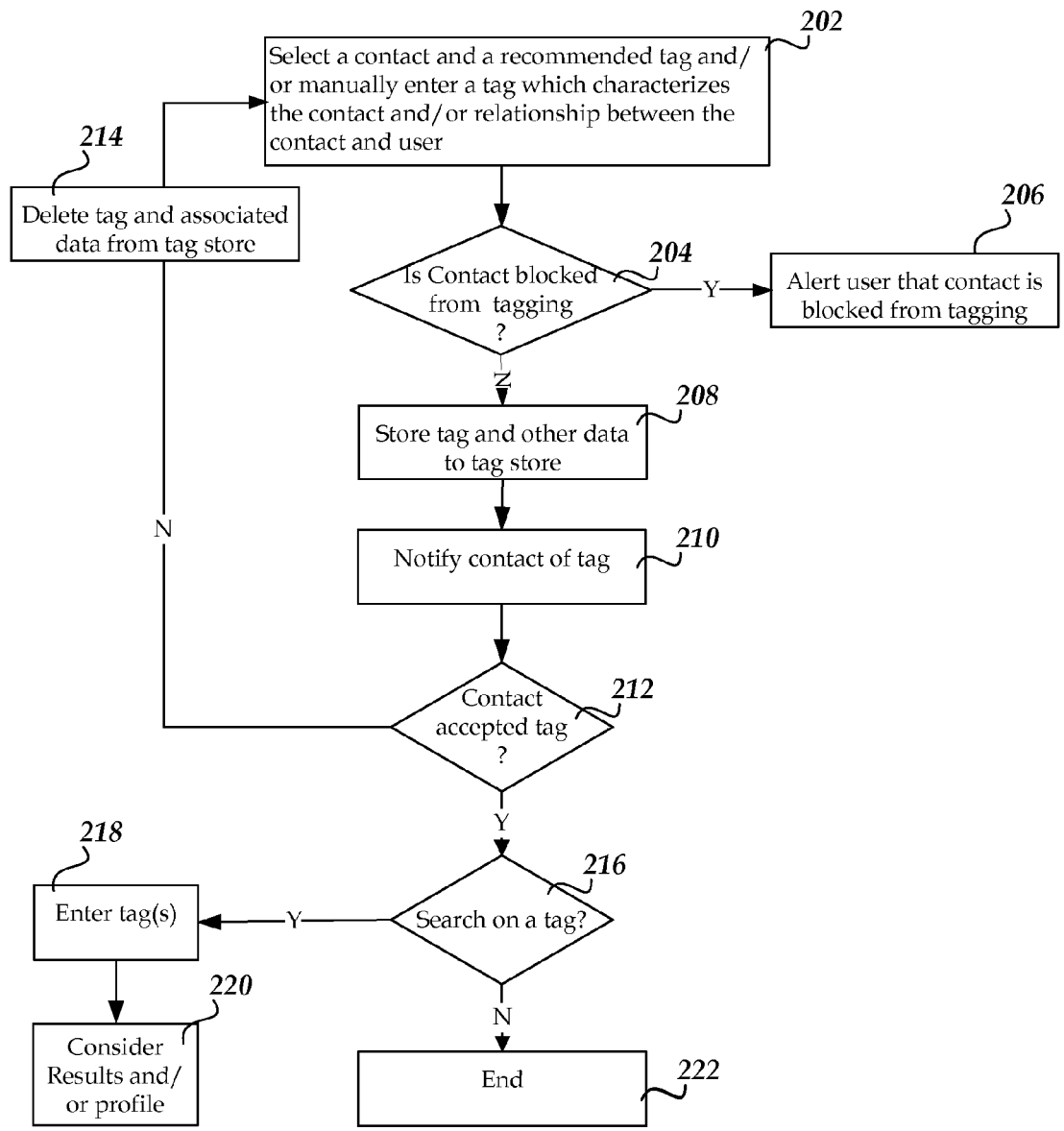
FIG. 2 is a flow diagram illustrating the creation and use of a characterizing tag.

FIG. 2 is a flow diagram illustrating the application of a characterizing tag, under an embodiment. The components of FIG. 1 will be used in describing the application of a characterizing tag, but the embodiment is not so limited. At 202, a user selects a contact from a contact repository to associate a characterizing tag with. The contact and/or contact repository may be associated with numerous applications, organizations, and/or other social settings. For example, the contact may be stored in a directory as part of an e-mail application. Moreover, the user and contact may or may not have communicated in the past. For example, another user may have sent a profile, such as a vcard, to the user which has been stored as part of a contact store.

Once the user has selected a contact in which to associate a characterizing tag, the user can manually assign a characterizing tag using the tag component 102, as described below. The user can also select one or more recommended tags that are recommended by the recommendation component 110. For example, a characterizing tag may characterize the contact based on a user's perspective, a prior communication, and/or a relationship between the contact and user, as described above. Once the user has manually entered a characterizing tag and/or selected a recommended characterizing tag, the user can add the characterizing tag to the contact. At 204, the administration component 118 determines whether the particular contact is blocked from being tagged. If the contact is blocked from being tagged, the flow proceeds to 206 and the user is alerted by the notification component 112 that this particular contact is blocked from being tagged.

If the contact is not blocked from being tagged, at 208, the characterizing tag and other data can be stored in the tag store 104. For example, the user's identification information and date/time that the tag was applied can be stored along with the characterizing tag in the tag store 104 as metadata. Once stored in the tag store 104, the characterizing tag is now associated with the contact and can be accessed and used by others in various contexts. For example, only certain users having specific privileges may be able to use the tagging system 100. Correspondingly, another user having access to the tagging system 100 may be looking for someone who has certain characteristics that can be uncovered by performing a search of a particular characterizing tag, as described below.

At 210, the notification component 112 notifies the contact of the tagging event. In one embodiment, the notification component 112 is configured to send an e-mail notification to the contact of the tagging event which includes the particular characterizing tag and the identity of the tagger. In another embodiment, the notification component 112 is configured to send a text message or voicemail, alerting the contact of the tagging event. At 212, the tagged contact can accept, reject, or modify the characterizing tag. If the tagged contact rejects the characterizing tag at 212, the flow proceeds to 214, and the tag component 102 deletes the tag and any associated data from the tag store 104.

At 216, the user or another user may perform a search by using the search component 114 to search for one or more contacts based on a characterizing tag. If a search is not warranted, the flow ends at 222. If a search is executed using the search component 114, one or more tags are entered and used by the search component 114 to search the tag store 104 at 218. If the search is successful, at 220, the searcher can consider the search results and/or the profile of a particular contact associated with the search terms. For example, the search component 114 may return search results based on an exact match of the searched tag or an approximate match of the searched tag. The searcher may also further refine the search results by performing the search again with additional filtering and/or limiting parameters, as described above.

Figure 3A:
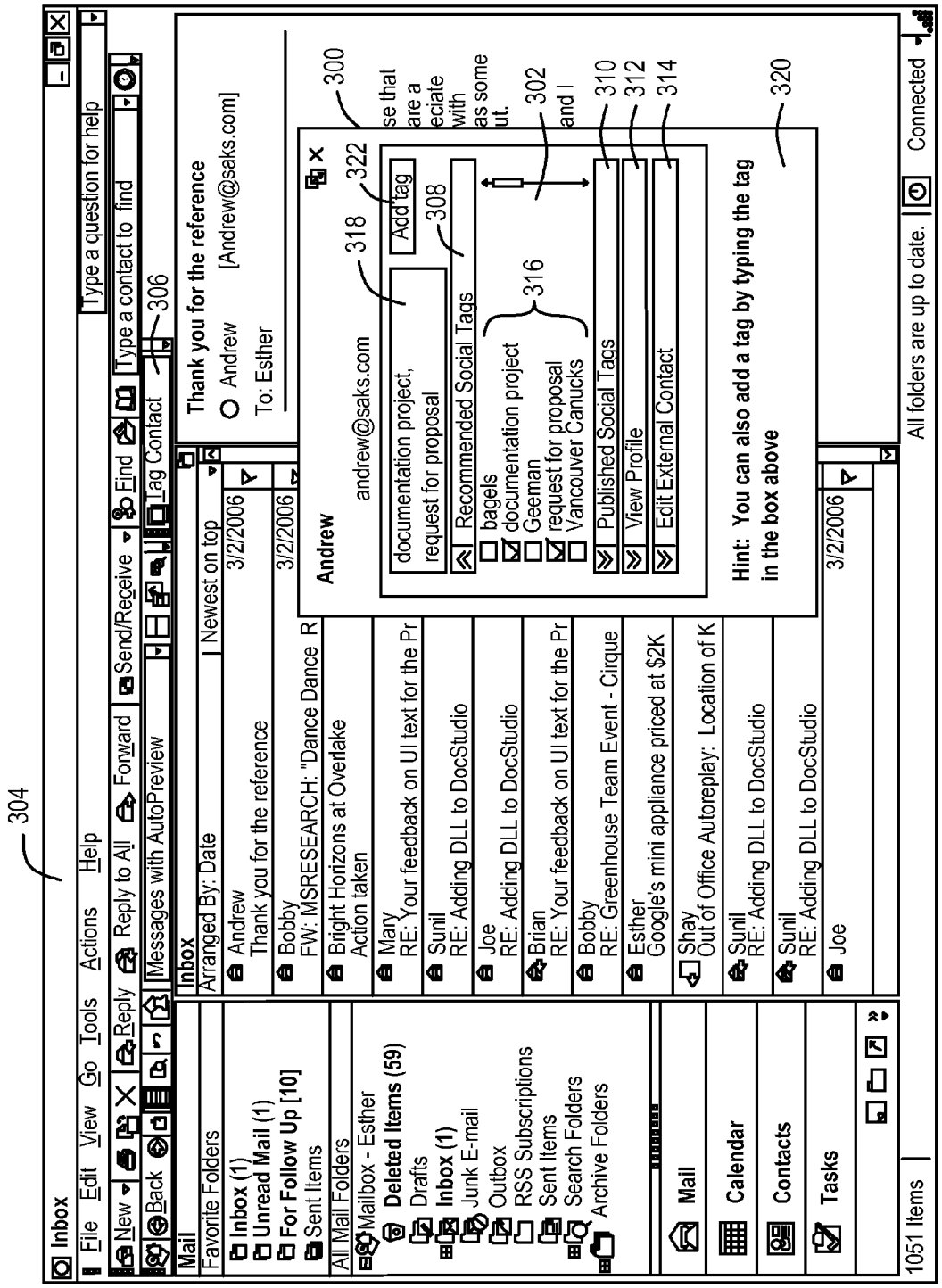
FIGS. 3A-3B depict features of a tagging application.
Figure 3B:
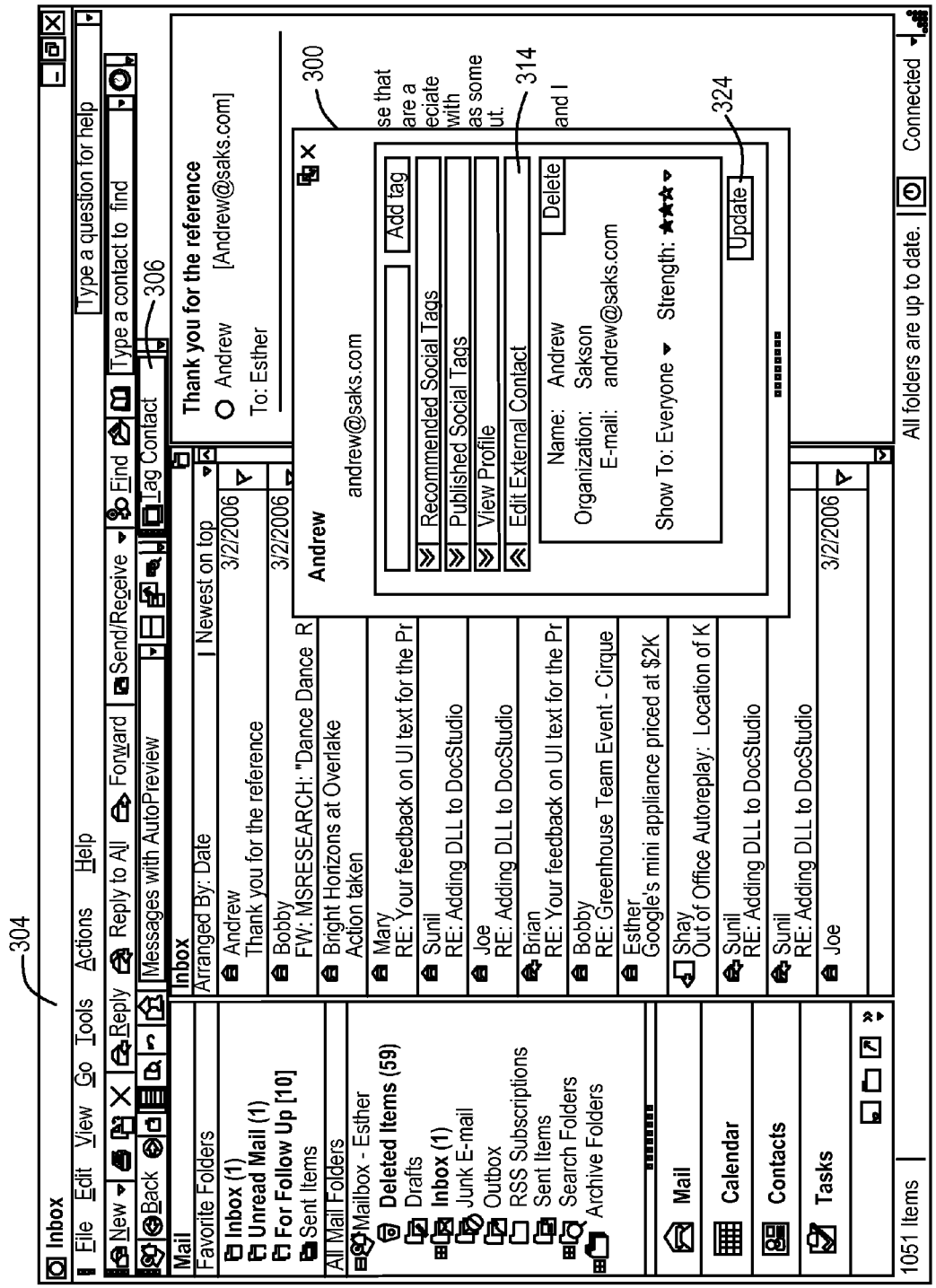

FIGS. 3A-3B depict features of a tagging application 300, under an embodiment. The tagging application 300 provides a tagging interface 302 that a user can use to assign, share, and/or locate characteristic information associated with others. In one embodiment, a user can use the tagging application 300 to assign, share, and/or locate characteristic information associated with a contact according to the user's personal perception, prior communication, and/or relationship with the contact.

FIG. 3A depicts a communication application 304 that includes tagging tools. The communication application 304 can include any application that allows a user to communicate with others and/or organize contact-related information, such as e-mail applications, scheduling applications, SHAREPOINT applications, handheld applications, and/or other contact-related applications. A user can use the tagging tools to tag a person of interest with a characterizing tag. The tagging application 300 can be configured to execute with the communication application 304. Thus, the tagging application 300 is available to the user who is using the communication application 304. Alternatively, the communication application 304 can be configured to include the functionality of the tagging application 300. Other applications can also be configured to include the functionality of the tagging application 300.

The tagging application 300 can be used by using the "Tag Contact" button 306 after selecting a contact to tag. Alternatively, the tagging application 300 can be used by right clicking on a contact and selecting "tag contact" from a drop-down menu. As shown in FIG. 3A, a user of the communication application 304 has clicked on the "Tag Contact" button 306 which has brought up the tagging interface 302 for the contact "Andrew."

The tagging interface 302 includes a number of interactive displays. According to the embodiment shown in FIG. 3A, the tagging interface 302 includes a "Recommended Social Tags" interactive display 308, a "Published Social Tags" interactive display 310, a "View Profile" interactive display 312, and an "Edit External Contact" interactive display 314.

The user has selected the "Recommended Social Tags" interactive display 308 which operated to display a number of recommended characterizing tags 316 for Andrew. The recommended characterizing tags 316 can be based on prior communications between the user and Andrew as described above, but are not so limited. In an embodiment, the recommended characterizing tags 316 exclude prior tags applied by the particular user to Andrew.

According to this example, the recommended characterizing tags 316 include: "bagels," "documentation project," "Geeman," "request for proposal," and "Vancouver Canucks." The user has selected "documentation project" and "request for proposal" as characterizing tags for Andrew. The user's characterizing tag selections are shown in the pane 318. The tagging interface 302 also includes a "hint" box 320. The hint box 320 informs the user of the capability to type in any characterizing tag in the pane 318.

The user can use the "Add Tag" button 322 to add the characterizing tags, which are then associated with Andrew. FIG. 3B depicts the tagging interface 302 after the user has selected the "Edit External Contact" interactive display 314 for Andrew. The user can edit, add, and delete data associated with Andrew after selecting the "Edit External Contact" interactive display 314. After making any changes to the data associated with Andrew, the user can select the "Update" button 324 to update and save the changes to the data.

Figure 4:
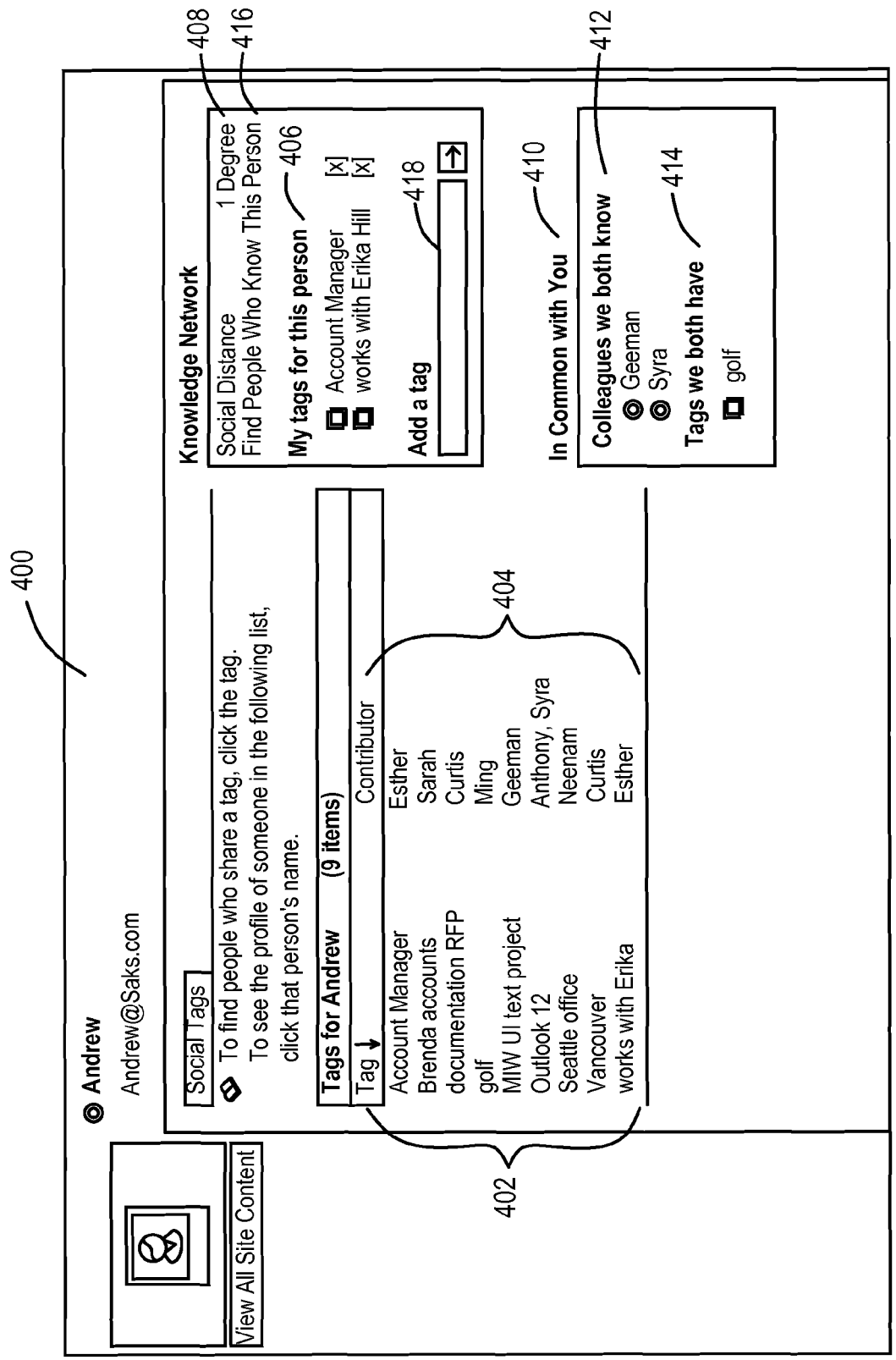
FIG. 4 depicts a social tag user interface.

FIG. 4 depicts a social tag user interface 400, under an embodiment. The social tag user interface 400 includes a profile for Andrew. The profile displayed in the social tag user interface 400 may result from a search on one or more characterizing tags, for example. The profile can also be viewed as part of a contact display or other application. As described above, the presentation component 116 of the tagging system 100 is configured to provide such an interface. As shown in FIG. 4, the social tag user interface 400 includes a tag list 402, listing a number of characterizing tags that are associated with Andrew. The social tag user interface 400 also includes a list of contributors 404 who have associated particular characterizing tags with Andrew.

The social tag user interface 400 also includes the tagger's characterizing tags for Andrew in the "My tags for this person" display 406. The social tag user interface 400 also displays a social distance 408 of "1 degree" as associated between Andrew and the tagger. The social tag user interface 400 further includes an "In Common with You" display 410. The "In Common with You" display 410 includes a "Colleagues we both know" list 412 and "Tags we both have" list 414. The social tag user interface 400 also includes a button 416 that is configured to locate other people who know Andrew, when actuated. The social tag user interface 400 further includes an "Add a tag" box 418, wherein the user can add additional characterizing tags for Andrew.

Figure 5:
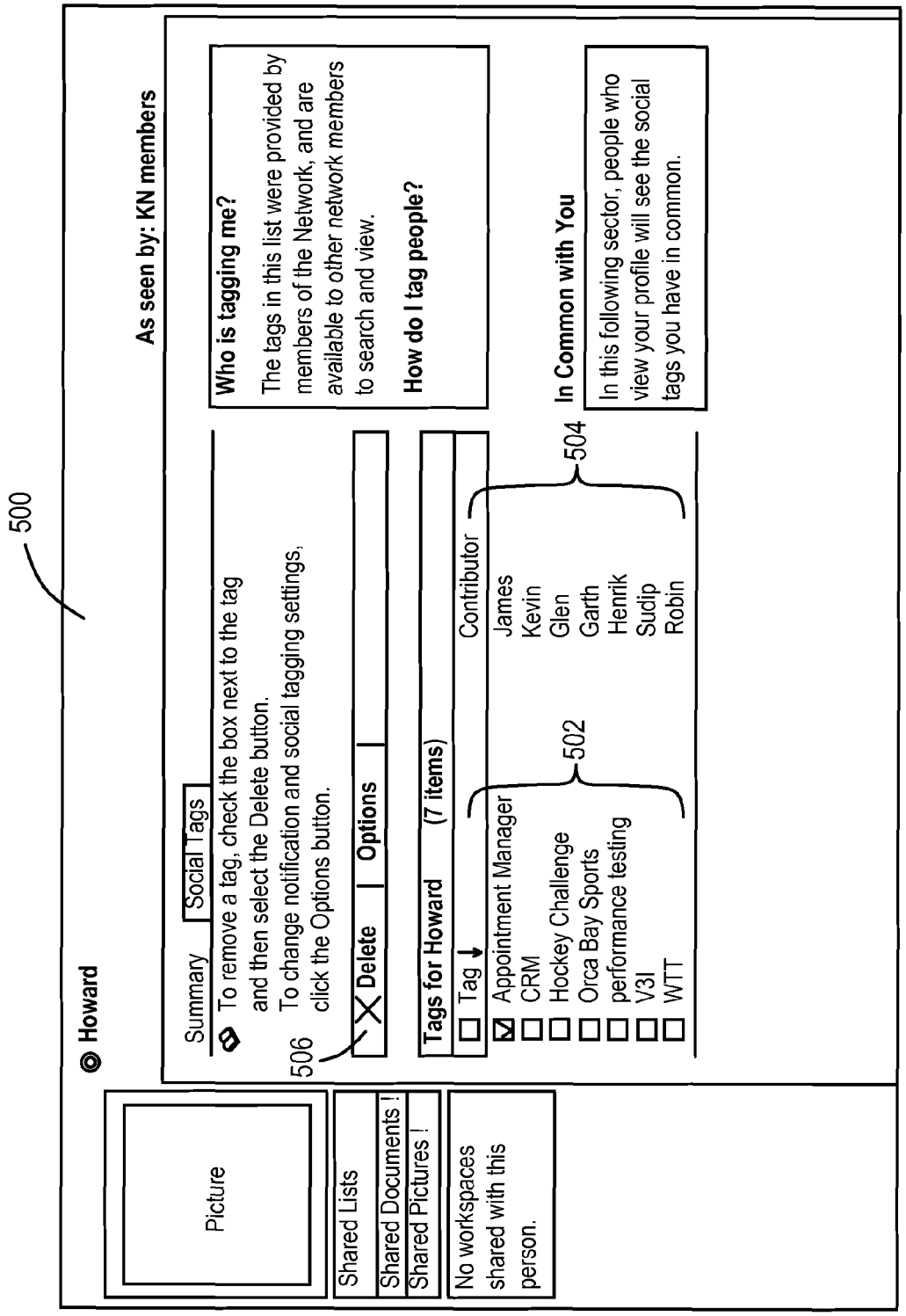
FIG. 5 depicts a social tag user interface.

FIG. 5 depicts a social tag user interface 500, under an embodiment. The social tag user interface 500 includes a user's social tag profile ("Howard"). As shown in FIG. 5, a number of characterizing tags 502 have been associated with the user by a number of contributors 504. If the current user is the owner of the profile, the "Delete" button can be used to remove certain characterizing tags that have been associated with the user by contributors. For example, FIG. 5 shows that the user has selected the "Appointment Manager" tag that was applied by the contributor "James." The user can click the "Delete" button 506 after selecting one or more characterizing tags, which operates to delete the selected tags from a tag store.

Figure 6:
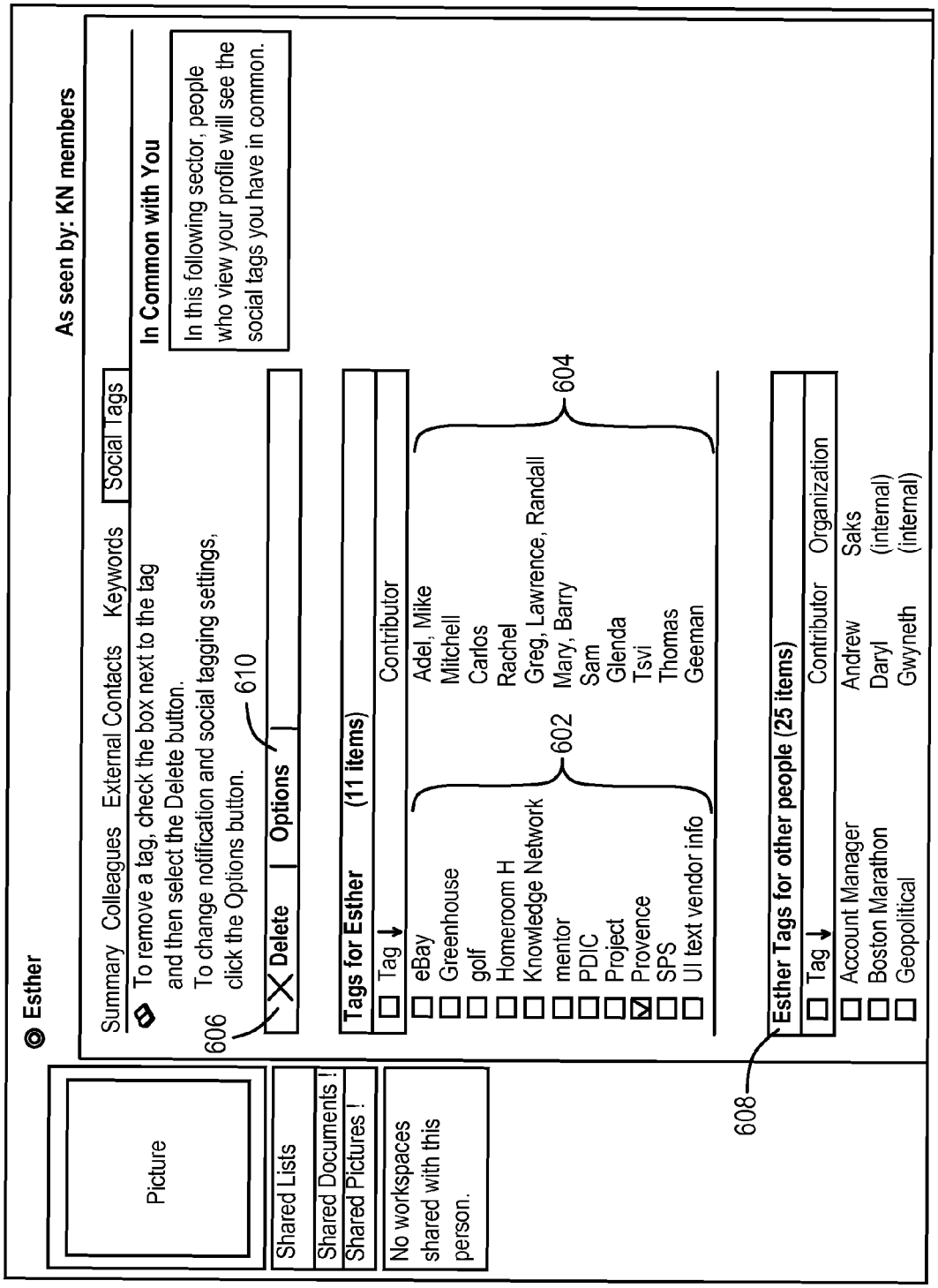
FIG. 6 depicts a social tag user interface.

FIG. 6 depicts a social tag user interface 600, under an embodiment. The social tag user interface 600 includes a user's social tag profile ("Esther"). As shown in FIG. 6, a number of characterizing tags 602 have been associated with the user by a number of contributors 604. The user has selected the "Provence" tag that was applied by the contributor "Tsvi." The user can click the "Delete" button 606 after selecting one or more characterizing tags, which operates to delete the selected tags from the tag store.

As shown in FIG. 6, the social tag user interface 600 is also displaying characterizing tags 608 that the user has associated with other people. If the current user is the owner of the profile, the "options" button 610 can be used to implement certain settings associated with characterizing tags. For example, the owner can use the "options" button 610 to opt-out of tagging and prevent others from applying tags. As further example, the owner can use the "options" button 610 to only allow users within a designated social distance to apply tags to the owner's profile.

Figure 7:
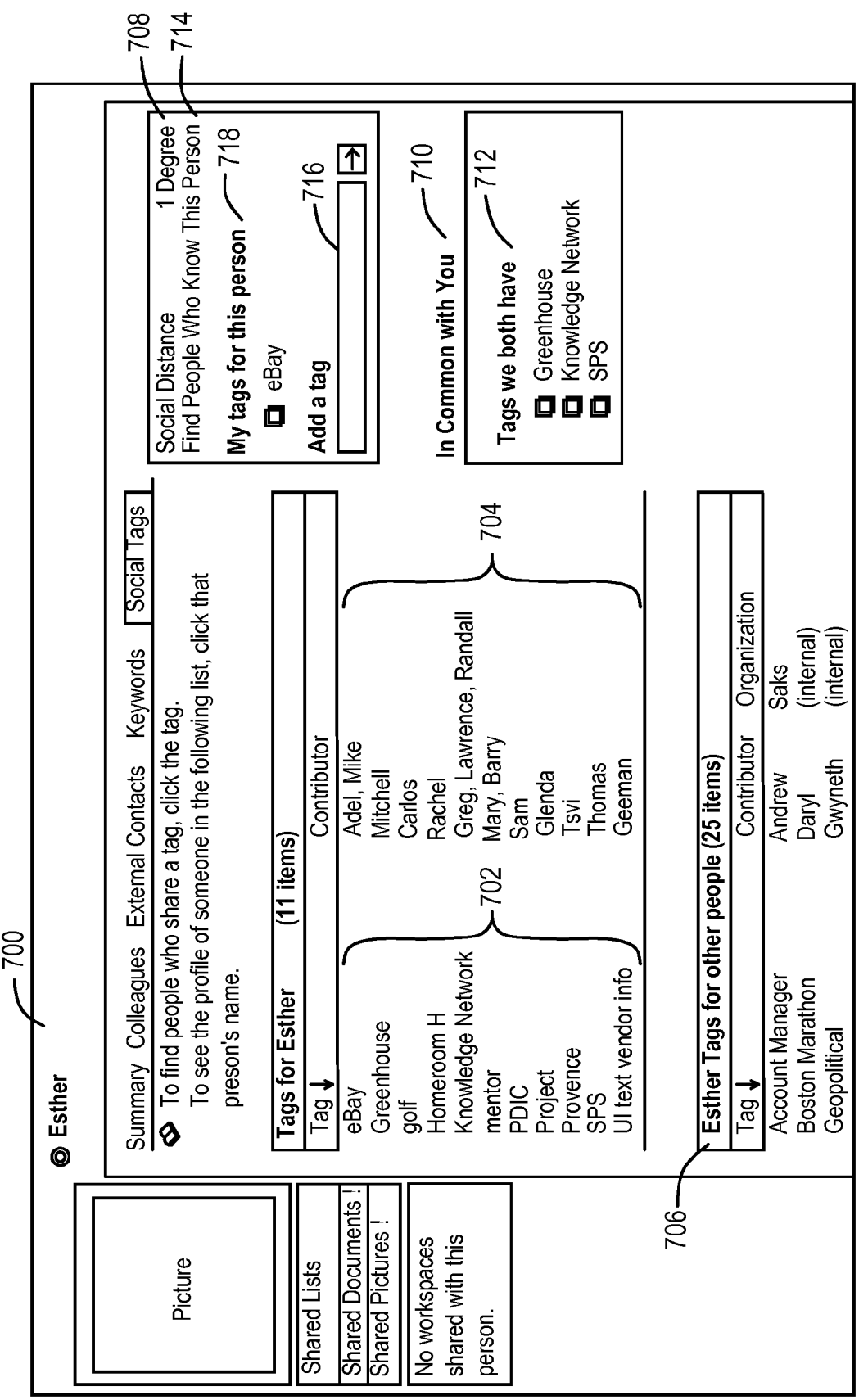
FIG. 7 depicts a social tag user interface.

FIG. 7 depicts a social tag user interface 700, under an embodiment. The social tag user interface 700 includes a contact profile for Esther. The profile displayed in the social tag user interface 700 may result after a search on one or more characterizing tags, for example. As shown in FIG. 7, the social tag user interface 700 includes a tag list 702, listing a number of characterizing tags that are associated with Esther. The social tag user interface 700 also includes a list of contributors 704 who have associated particular characterizing tags with Esther. The social tag user interface 700 is also displaying characterizing tags 706 that Esther has associated with other people.

The social tag user interface 700 also displays a social distance 708 of "1 degree" as associated between Esther and the user viewing Esther's profile. The social tag user interface 700 further includes an "In Common with You" display 710. The "In Common with You" display 710 includes "Tags we both have" list 712. The social tag user interface 700 also includes a button 714 that is configured to locate other people who know Esther, when actuated. The social tag user interface 700 further includes an "Add a tag" box 716, wherein the user can add additional characterizing tags for Esther. The social tag user interface 700 also includes a "My tags for this person" display 718 that lists tags that the user has associated with Esther.

Figure 8:
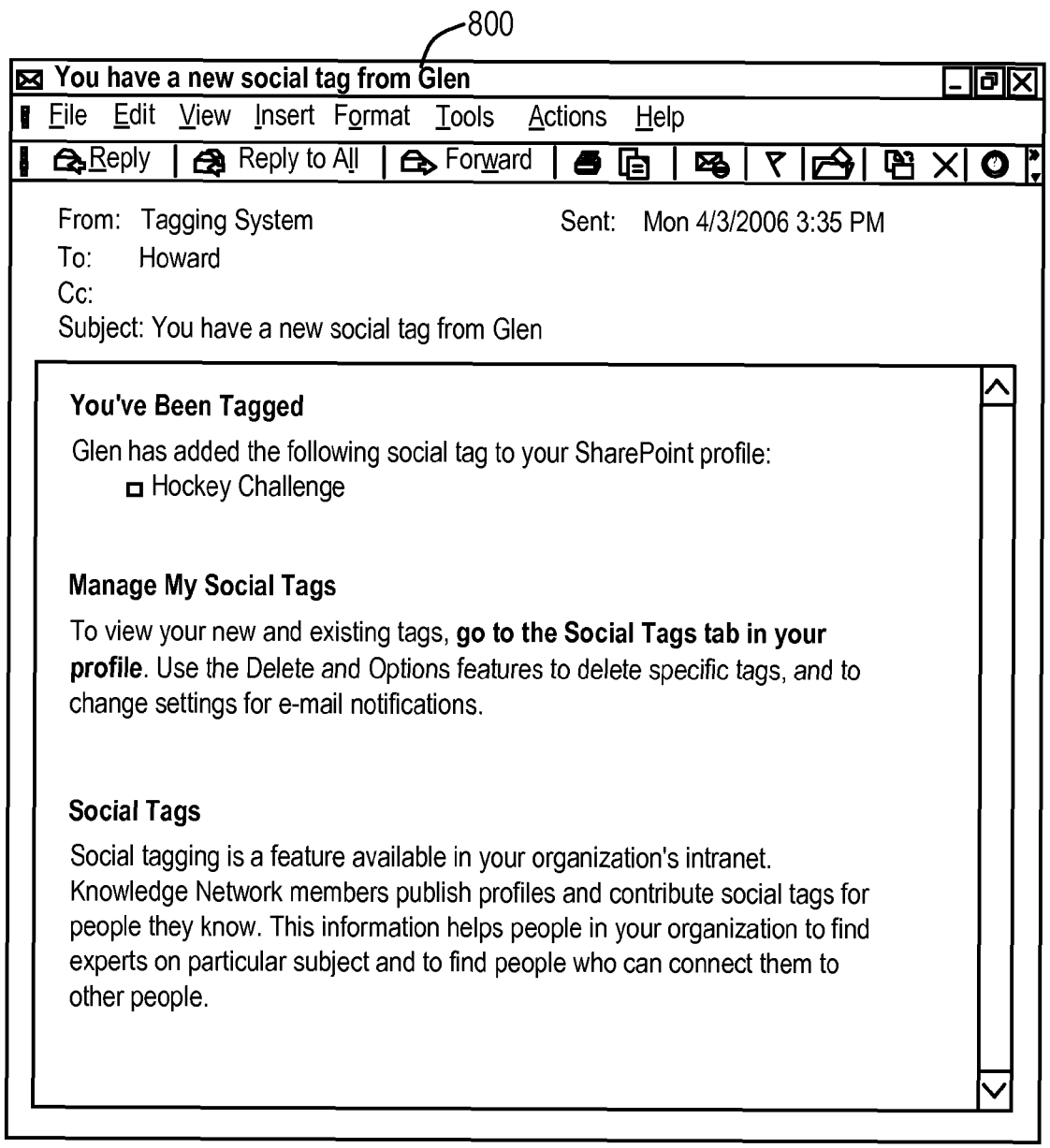
FIG. 8 depicts a tag notification interface.

FIG. 8 depicts a tag notification interface 800, under an embodiment. The tag notification interface 800 may be in the form of an e-mail notification for example. A user may have received the tag notification interface 800 after being tagged with a characterizing tag. As shown in FIG. 8, the tag notification interface 800 displays the name of the tagger ("Glen") and the characterizing tag ("Hockey Challenge") that was applied by the tagger. In one embodiment, the user can change notification settings to prevent future tag notifications.

Figure 9:
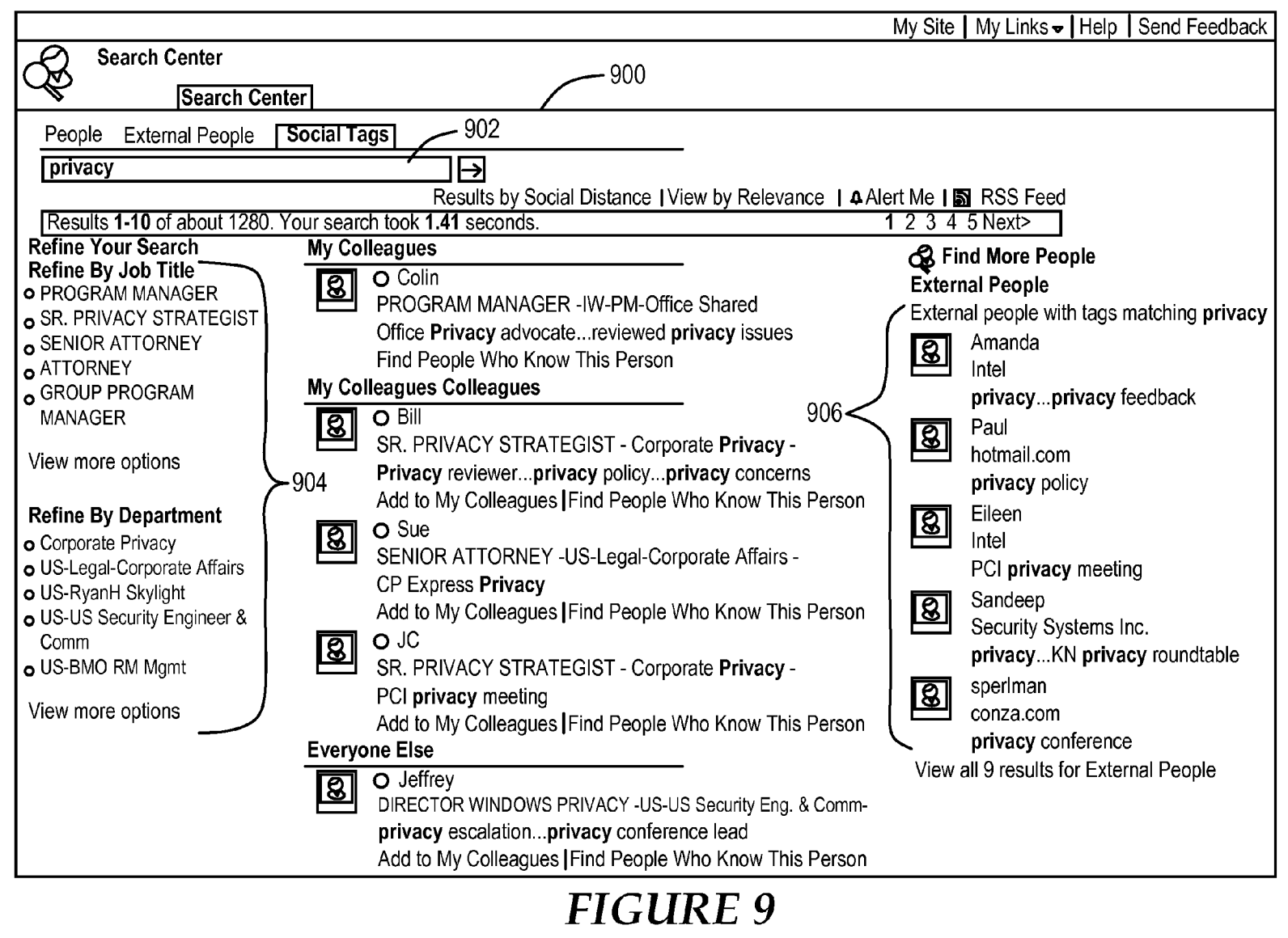

FIG. 9 depicts a tag search interface 900, under an embodiment. For example the tag search interface 900 can be included as part the search component 114 of the tagging system 100 of FIG. 1. A user can use the tag search interface 900 to input one or more characterizing tags as part of a tag search to locate one or more persons of interest, such as one or more contacts for example. As shown in FIG. 9, the user has entered the term "privacy" as a characterizing tag in the search pane 902 in an attempt to locate one or more individuals who are tagged with the search term.

In one embodiment, the search component 114 is configured to organize the search results according to different factors, categories, or other criteria. As shown in FIG. 9, as a result of the tag search, one contact ("Colin") has been organized and presented by the presentation component 116 according to the searcher's colleagues. Three contacts ("Bill," "Sue," and "JC") have been organized and presented by the presentation component 116 according to the colleagues of the searcher's colleagues. One contact ("Jeffrey") has been organized and presented by the presentation component 116 according to everyone else that was not categorized in the first 2 categories.

The tag search has also resulted in the location of a number of external contacts 906. The external contacts 906 also have characterizing tags that include the search term "privacy." The searcher can select a number of filtering refinements 904 to further refine the search results based on the particular filter and characterizing tag. The searcher can also click on any located contact to view the associated profile including any other characterizing tags. A characterizing tag search enables a user to locate one or more contacts that are associated with the particular characterizing tag. A user can use the results of the search in attempts to contact any of the located contacts in further communications.

The tagging system 100 can be implemented in various computing architectures and is not limited to any particular computing architecture. Moreover, the components of the tagging system 100 can be combined or modified to provide a particular functionality. In an embodiment, the components of the tagging system 100 can be implemented as part of a client-server architecture, wherein a serving computing device can be used to maintain the tag store 104, information collection store 108, and be used to administer features of the tagging system 100 with the administration component 118. In such an embodiment, each client computing device can interact with the serving computing device to ascertain one or more tags that are associated with one or more contacts in the tag store 104. For example, tags can be uploaded to the serving computing device and associated with a SHAREPOINT profile. The tagging system 100 can also be implemented as part of an enterprise, such as part of a KNOWLEDGE NETWORK system.

In one embodiment, the tagging application 300 can be configured as a software application (also see FIG. 10 tagging application 24) that can be executed on a client computing device, such as an ultra-mobile computing device for example. According to such an embodiment, the tag store 112 can be stored locally (e.g. system memory 12 of FIG. 10) and/or on a dedicated serving computing device, wherein characterizing tags can be written and/or accessed accordingly. For example, characterizing tags that are associated with a particular tagger can be stored locally on the tagger's computing device and accessed by other users with proper authentication credentials that are included as part of a distributed computing network.

In yet another embodiment, the tagging system 100 can be implemented as part of a web-based application and architecture provided by a service provider that can operate in conjunction with other applications (e.g. e-mail applications, text messaging applications, mobile communication applications, etc.) to enable tagging and tag searching functionality described herein.

The tagging system 100 can be employed in a variety of computing environments and applications. For example, the tagging system 100 can used with computing devices having networking, security, and other communication components configured to provide communication functionality with other computing and/or communication devices. Exemplary computing devices include desktop computers, laptop computers, tablet computers, handheld devices (e.g. smart phone, ultra-mobile personal computer, etc.), and/or other communication devices.

As described herein, users can create and use one or more characterizing tags to characterize one or more persons of interest, such as one or more contacts for example. Users can perform searches using one or more characterizing tags to locate persons of interest that are associated with the one or more characterizing tags. Users can also view and/or communicate with one or more persons of interest after viewing the results of a tag search. The embodiments described herein can be used with a number of applications and are not limited to any particular implementation or architecture. Accordingly, the embodiments and examples described herein are not intended to be limiting and other embodiments are available.

Exemplary Operating Environment

Figure 10:
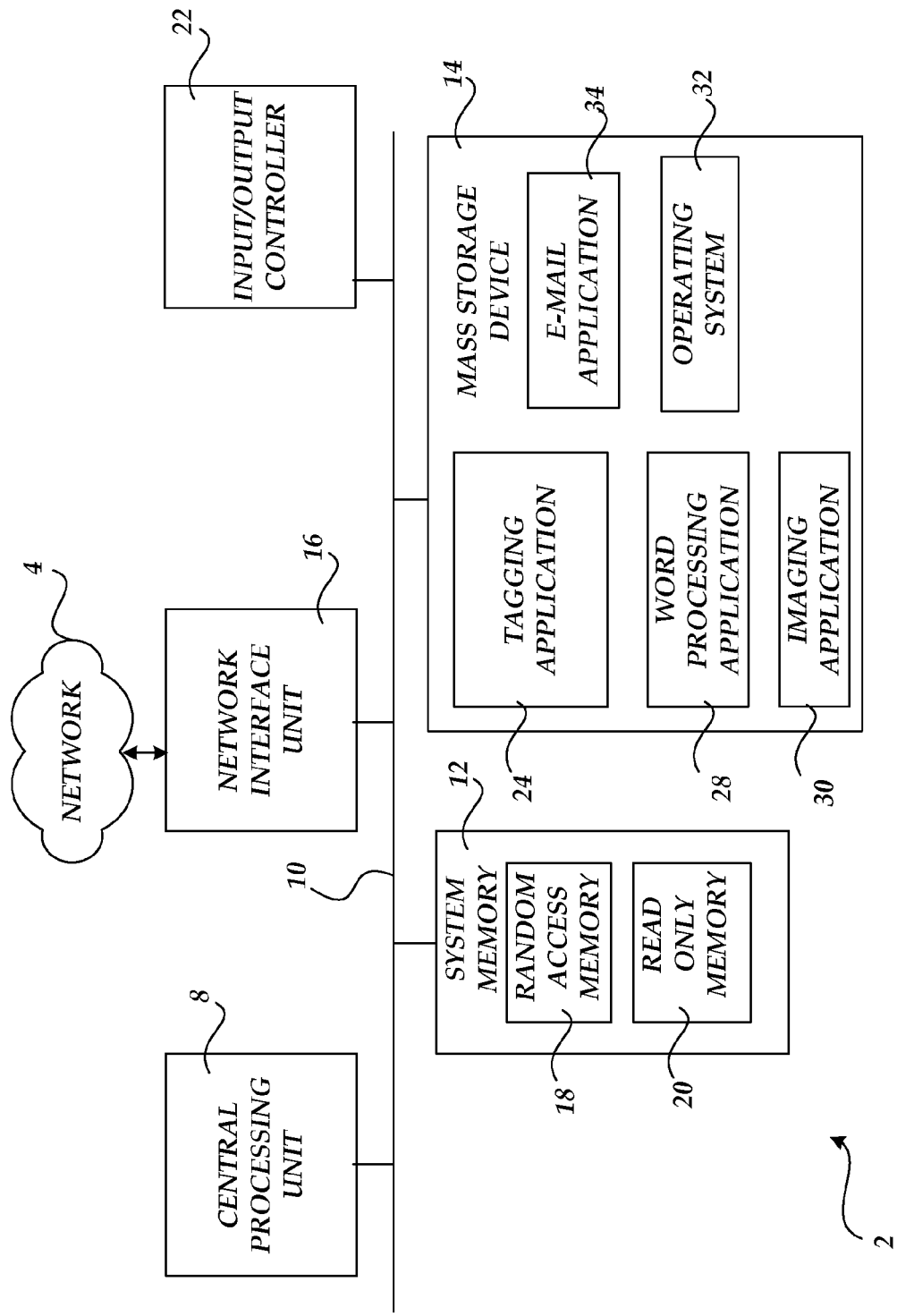
FIG. 10 is a block diagram illustrating a computing environment for implementation of various embodiments described herein.

Referring now to FIG. 10, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 10, an illustrative operating environment for embodiments of the invention will be described. As shown in FIG. 10, the computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, application programs, such as a tagging application 24, and other program modules. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. for example. The mass storage device 14 and RAM 18 may also store one or more program modules. In particular, the mass storage device 14 and the RAM 18 may store application programs, such as a word processing application 28, an imaging application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented user interface comprising:
   an interactive computer display configured to:
   identify a person of interest to associate with a tag;
   collect information associated with a number of electronic communications;
   present one or more recommended tags based in part on information collected from electronic communications with the person of interest;
   use a user characteristic tag selection to assign a characteristic tag for the person of interest according to a personal perception of a tagging user, wherein the characteristic tag identifies information associated with a contact and defines an association with the contact based in part on prior electronic communications with the contact; and
   present characteristic tag information to other users and any common tags including shared common characteristic tags.

2. The user interface of claim 1, wherein the interactive display is further configured to add tags for other persons of interest by selecting another person of interest to tag with a common or a different tag.

3. The user interface of claim 1, wherein the interactive display is further configured to enable selection of a recommended tag to tag the person of interest.

4. The user interface of claim 1 implemented as part of a web-based application.

5. The user interface of claim 1, wherein the characteristic tag includes metadata associated with an object that represents the person of interest.

6. The user interface of claim 1, wherein the interactive display is further configured to locate a contact based in part on a search for characteristic tag.

7. The user interface of claim 1, wherein the interactive display is further configured to present a profile of a contact including any associated characteristic tags.

8. The user interface of claim 1, wherein the characteristic tag corresponds to something that concerns, involves, draws the attention of, or arouses the curiosity of the person of interest.

9. The user interface of claim 8, wherein the characteristic tag refers to particular aspects of life, culture, or society.

10. The user interface of claim 1, wherein the interactive display is further configured to present one or more words of a prior communication with the person of interest as recommended characteristic tags.

11. The user interface of claim 1, wherein the interactive display is further configured to provide profile information associated with a search result including any other characteristic tags.

12. The user interface of claim 1, wherein the interactive display is further configured to provide a search result including a number of external contacts associated with one or more tags.

13. The user interface of claim 1, wherein the interactive display is further configured to block one or more people from being tagged.

14. A method comprising:
   collecting information associated with a number of electronic communications;
   recommending a number of characteristic tags associated with a person of interest as part of a tagging operation, including recommending one or more characteristic tags based in part on the information collected from the electronic communications;
   using a user characteristic tag selection and applying the user selected characteristic tag to the person of interest, wherein the user selected characteristic tag is based in part on at least one of a communication or an association with the person of interest;
   identifying other users that share a common characteristic tag; and, storing the select characteristic tag and identification information associated with a tagging user that tagged the person of interest with the user selected characteristic tag in a tag store comprising a computer-readable storage medium.

15. The method of claim 14, further comprising displaying tag information including information of other users that share common characteristic tags.

16. The method of claim 14, further comprising recommending one or more tags based in part on collected nouns and phrases.

17. The method of claim 14, further comprising notifying the person of interest of a tag event.

18. A device comprising:
   a processor, memory, and a display configured to:
      identify a person of interest to associate with a tag;
      collect information associated with a number of electronic communications;
      present one or more recommended tags based in part on the information collected from electronic communications with the person of interest, wherein the recommended one or more characteristic tags are based in part on the information collected from the electronic communications;
      associate a user selected characteristic tag with the person of interest wherein the user selected characteristic tag is based in part on at least one of a communication or an association with the person of interest; and
      present characteristic tag information associated with the user selected characteristic tag and other user information including any associated common tags.

19. The device of claim 18, wherein the processor, memory, and display resources are further configured to provide one or more persons of interests based in part on a characteristic tag search.

20. The device of claim 18, further comprising a client computing device in communication with a serving computing device.

* * * * *